J. T. LEACH.
FEEDING MECHANISM FOR SAW TABLES.
APPLICATION FILED MAR. 26, 1915.
1,265,215.
Patented May 7, 1918.
2 SHEETS—SHEET 2.
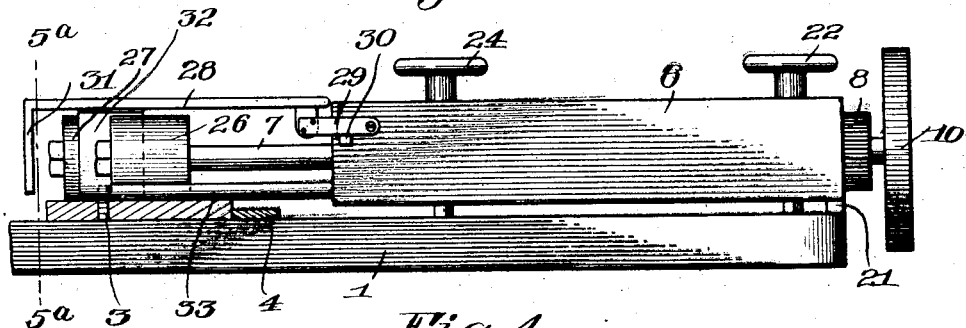
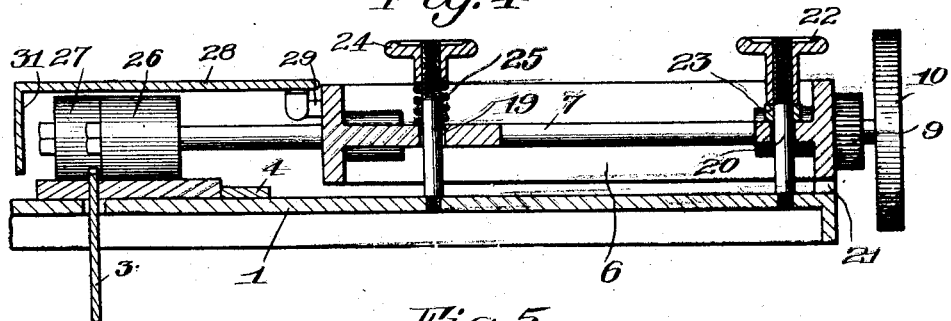
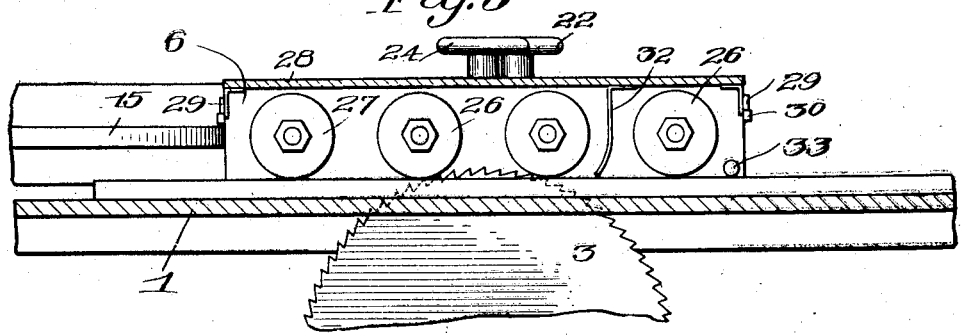
WITNESSES:
INVENTOR
John T. Leach

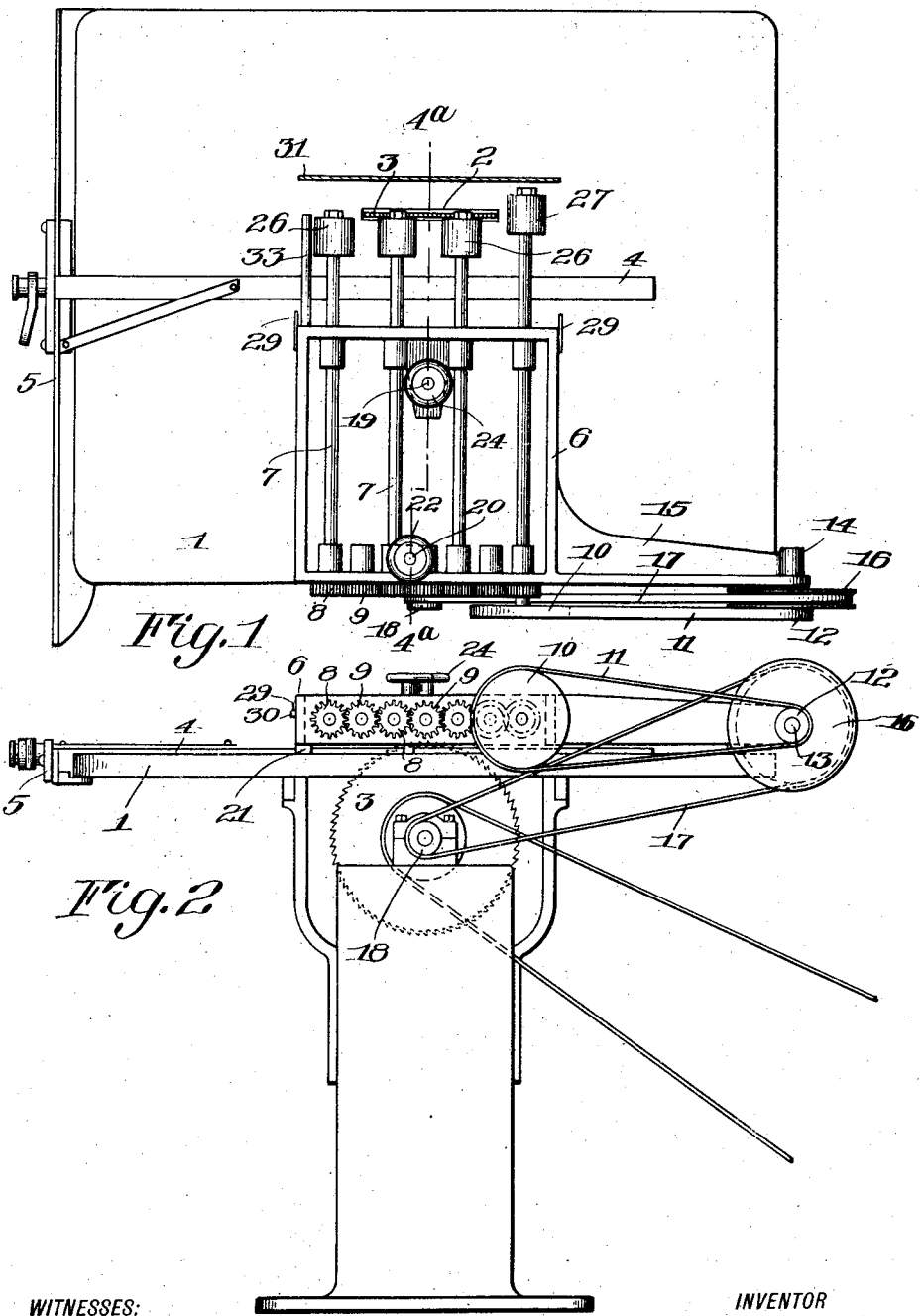

UNITED STATES PATENT OFFICE.

JOHN T. LEACH, OF ROCHESTER, NEW YORK.

FEEDING MECHANISM FOR SAW-TABLES.

1,265,215.   Specification of Letters Patent.   Patented May 7, 1918.

Application filed March 26, 1915. Serial No. 17,085.

*To all whom it may concern:*

Be it known that I, JOHN T. LEACH, of Rochester, in the county of Monroe and State of New York, have invented certain new and useful Improvements in Feeding Mechanism for Saw-Tables; and I do hereby declare the following to be a full, clear, and exact description of the same, reference being had to the accompanying drawings, forming a part of this specification, and to the reference-numerals marked thereon.

My invention has for its object to provide a novel work feeding mechanism for saw tables and the like, one of its chief functions being to feed the work evenly across the table maintaining it in proper relation to the cutting member. A further object of the invention is to provide an improved organization of parts which will fully protect the operator against injury from coming in contact with the saw, and also from flying particles that may be thrown in the operator's direction. Another purpose of the improvement is to simplify the construction of this class of devices and render the apparatus subject to easy control. To these and other ends the invention resides in certain improvements and combinations of parts all as will be hereinafter more fully described, the novel features being pointed out in the claims at the end of the specification.

In the drawings:

Figure 1 is a plan view showing a saw table equipped with the invention, the guard portion appearing in section;

Fig. 2 is an end elevation;

Fig. 3 is a side elevation with a piece of work in position, the guide for the gage being removed;

Fig. 4 is a vertical sectional view on the line 4ª—4ª of Fig. 1, and

Fig. 5 is a sectional view on the line 5ª—5ª of Fig. 3.

Similar reference numerals throughout the several figures indicate the same parts.

In the present embodiment of the apparatus, 1 designates the work supporting table having an opening 2 which receives the cutting member, here shown as a rotary saw 3 that may be driven in any convenient manner. The position of the work is determined by an adjustable gage 4 which is movable on a guide 5 secured to the work table so as to be brought to any desired position in relation to the saw.

I will now describe the means by which the work is fed to the cutter, and the operator guarded from chips or flying particles as well as contact with the saw. To this end, I employ a movable frame or carrier arranged above the table and designated at 6. The frame is provided with a plurality of bearings in which are mounted shafts 7 carrying the feed rolls that will be more fully described presently. The shafts 7 are provided with pinions 8 while idler pinions 9 are arranged between the pinions 8 so that all of the feeding rolls are driven from one of the shafts 7, which carries a pulley 10 connected by a belt 11 with pulley 12. Pulley 12 is fixed on a shaft 13 journaled in a bearing 14 which is formed on an arm 15 of the frame 6. The shaft 13 also carries a pulley 16 connected by belt 17 with a pulley 18 arranged on the main shaft carrying the saw. The frame 6 is yieldably maintained on the table against upward movement in order to hold the rolls in feeding engagement with the work and at the same time permit their elevation to accommodate work of different thicknesses. To this end, the frame is provided with openings engaged by the posts 19 and 20. Blocks 21 are afforded at the edge of the table on which the frame 6 rests, and 22 is an adjustable nut engaging a resilient washer 23 and forcing it against the upper surface of the frame. 24 is an adjustable nut coöperating with the post 19 and acting to retain the spring 25 in engagement with the frame so that a slight upward movement of the latter is permitted against the tension of the spring 25 and about the blocks 21 as a pivotal axis.

The frame is provided with a plurality of feeding rolls arranged to engage on opposite sides of the cutting member in order to feed the main body of the work as well as the strip which is cut, and in the present arrangement, I have shown four rolls, preferably made of resilient material such as rubber, three being arranged in alinement and indicated at 26, while the roll 27 preferably extends on both sides of the saw and operates to engage and feed the portion of the work on the opposite side to the rolls 26.

In order to protect the operator from coming into contact with the saw, a guard member 28 is mounted on the frame 6. The guard member 28 is preferably movable on the frame in order to throw it into and out of operative relation and to this end, it can be carried by a pair of pivoted arms 29 which engage the stops 30 when in normal position. The guard member includes a side portion 31 and a deflector 32, the latter extending downwardly between two of the feeding rolls and at a point in advance of the saw so as to catch any particles that are thrown toward the operator and prevent them from flying any farther. It is also desirable to provide against coming into contact with the forward feeding roll and this I accomplish by employing a rod 33 secured to the frame 6 and extending in front of the roll, as shown in Fig. 3, preferably in a plane with the bottom of the roll.

I claim as my invention:

1. The combination with a work supporting table and a cutting tool in operative relation therewith, of a frame, one edge of which is arranged to bear loosely upon the support, a shaft journaled upon the frame and provided with a feed roll projecting therefrom on the side opposite said bearing edge, means for rotating the shaft, a guide for the frame projecting upwardly therethrough from the table at a point intermediate said feed roll and said bearing edge, and a spring yieldingly engaging the frame for holding the roll in contact with the work piece.

2. The combination with a work supporting table and a cutting tool in operative relation therewith, of a frame, one side of which is provided with a bearing edge arranged to bear loosely upon the support, a shaft journaled upon the frame provided with a feed roll and extending at substantially a right angle to said bearing edge, means for rotating the shaft and means engaging the frame for yieldingly holding the roll in contact with the work piece and said bearing edge with said support.

JOHN T. LEACH.

Witnesses:
H. E. STONEBRAKER,
RUSSELL B. GRIFFITH.

Copies of this patent may be obtained for five cents each, by addressing the "Commissioner of Patents, Washington, D. C."